US012434755B1

(12) United States Patent
Reichard et al.

(10) Patent No.: US 12,434,755 B1
(45) Date of Patent: Oct. 7, 2025

(54) STEERING COLUMN ASSEMBLY AND STEERING SHAFT ANTI-ROTATION BREAKAWAY DEVICE THEREFOR

(71) Applicant: Steering Solutions IP Holding Corporation, Saginaw, MI (US)

(72) Inventors: Benjamin D. Reichard, Saginaw, MI (US); Joseph A. Beck, Bay City, MI (US); Malgorzata R. Szeliga, Essexville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/739,761

(22) Filed: Jun. 11, 2024

(51) Int. Cl.
*B62D 1/16* (2006.01)
(52) U.S. Cl.
CPC ..................... *B62D 1/16* (2013.01)
(58) Field of Classification Search
CPC .................. F16M 13/00; B62D 1/16
See application file for complete search history.

(56) References Cited

U.S. PATENT DOCUMENTS

| 7,798,526 | B2* | 9/2010 | Lopez | B62D 1/195 188/371 |
| 8,627,742 | B2* | 1/2014 | Ridgway | B62D 1/192 74/493 |
| 9,039,041 | B2* | 5/2015 | Buzzard | B62D 1/16 280/771 |
| 10,156,865 | B2* | 12/2018 | Buzzard | B62D 1/16 |
| 2024/0300428 | A1* | 9/2024 | Thom | G06T 7/0004 |

* cited by examiner

*Primary Examiner* — Paul N Dickson
*Assistant Examiner* — Tiffany L Webb
(74) *Attorney, Agent, or Firm* — Dickinson Wright PLLC

(57) ABSTRACT

A steering column assembly having a tubular jacket assembly bounding a bore extending along a central axis between a jacket lower end and a jacket upper end and a steering shaft assembly extending along the central axis through the bore between a steering shaft lower end and a steering shaft upper end. A breakaway device extending between the tubular jacket assembly and the steering shaft assembly. The breakaway device having a first state, where the steering shaft assembly is prevented from being able to rotate relative to the tubular jacket assembly, and a second state, where the steering shaft assembly is free to rotate relative to the tubular jacket assembly. The breakaway device having at least one frangible tab having non-fractured state, where the breakaway device is in the first state, and a fractured state, where the breakaway device is in the second state.

20 Claims, 11 Drawing Sheets

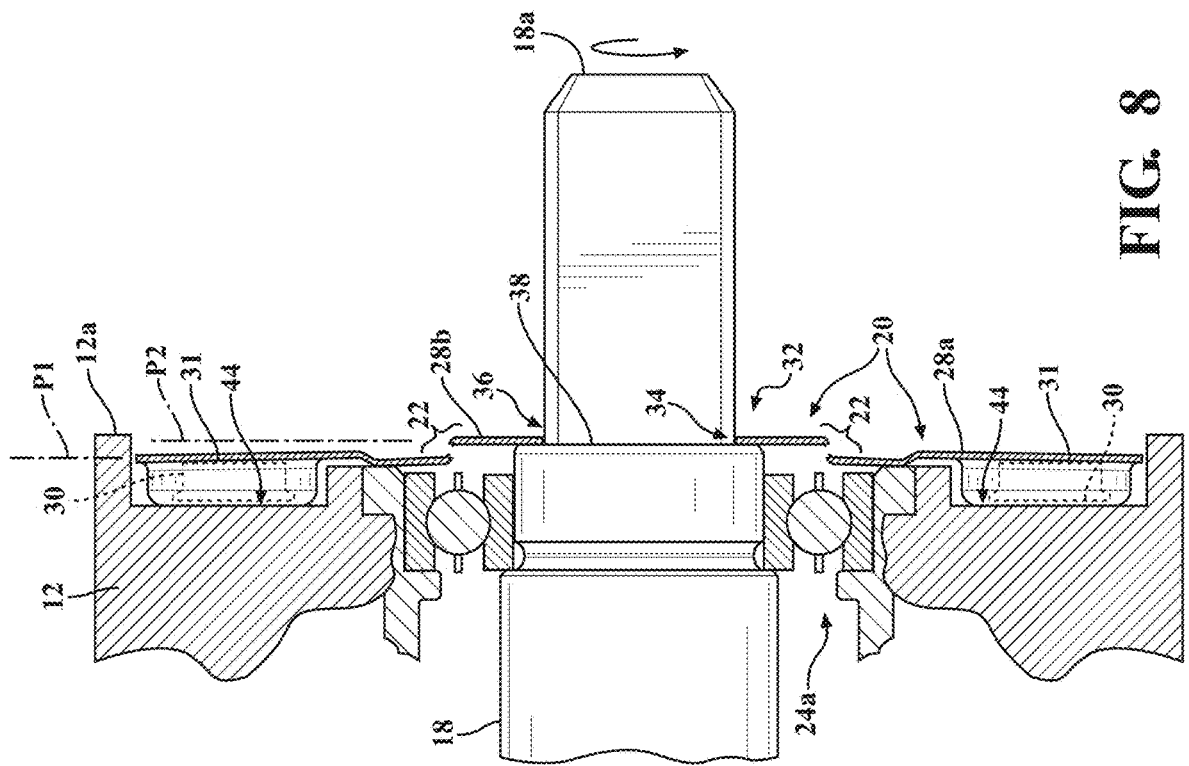
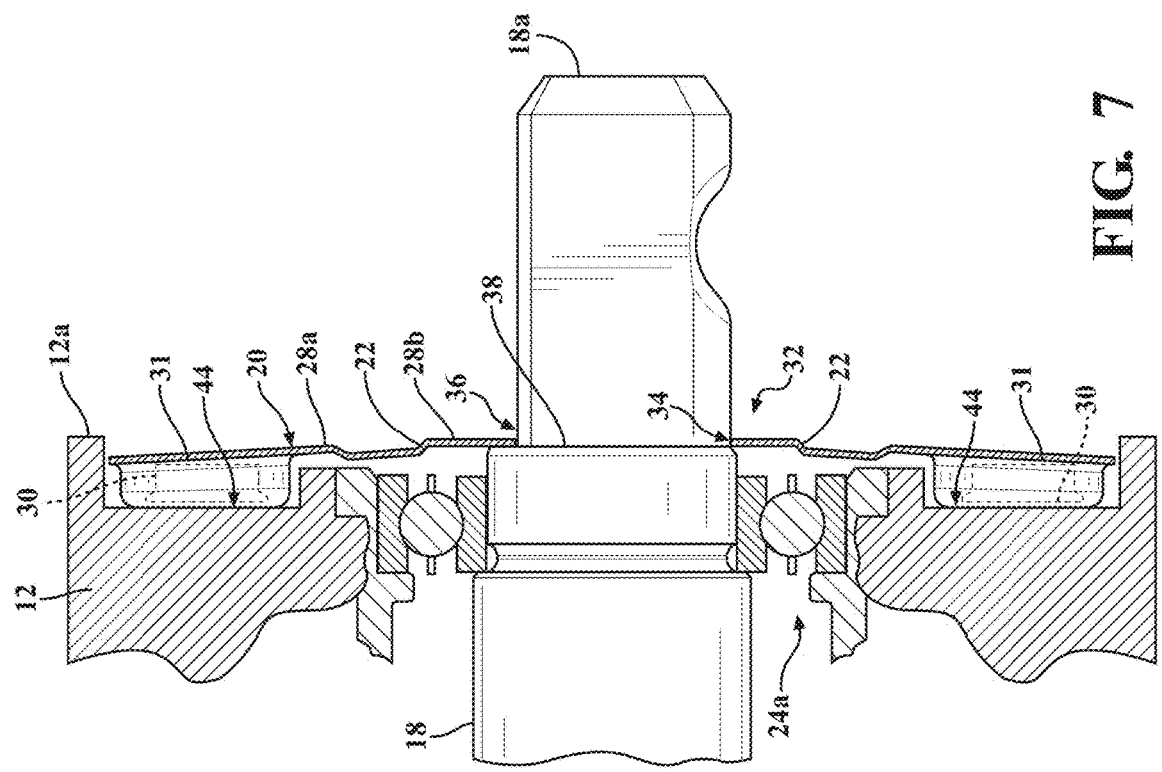

STEERING COLUMN ASSEMBLY AND STEERING SHAFT ANTI-ROTATION BREAKAWAY DEVICE THEREFOR

FIELD OF THE INVENTION

The following description relates generally to steering column assemblies and, more specifically, to an anti-rotation device for preventing rotation between a steering shaft and outer jacket during assembly.

BACKGROUND OF THE INVENTION

Vehicles typically have a steering column assembly including a central steering shaft disposed through an outer housing. To facilitate assembling the steering column, typically the outer housing, sometimes referred to as outer casing, jacket or tube, and the steering shaft are located in a predetermined rotational orientation, referred to as neutral orientation hereafter, relative to one another and prevented from moving therefrom during assembly, such that the steering shaft can be attached to its respective components, such as a steering gear, and the outer jacket can be attached to its respective component(s), such as a fixed frame member of a vehicle body. Accordingly, upon completing assembly, the outer jacket and steering shaft are properly oriented relative to one another in the neutral position.

A known mechanism for retaining the steering shaft and outer jacket in the neutral orientation with one another is to insert a metal pin through a pair of diametrically opposite through openings in the outer jacket, referred to as jacket openings, and a pair of diametrically opposite through openings in the steering shaft, referred to as shaft openings, thereby locking the steering shaft and outer jacket in the neutral position against rotation relative to one another. Then, upon completing assembly of the steering column assembly, the steel pin is pulled outwardly from the shaft and jacket openings. Although generally effective in preventing movement of the steering shaft and outer jacket relative to one another during assembly, some problems can arise.

For example, the shaft openings and jacket openings have tolerances, and does the steel pin, and thus, a variety of fits of the steel pin within the shaft and jacket openings arises, including tight, line-to-line, and loose. In the case of a tight fit, removal of the steel pin after assembly can be difficult, thereby causing a potentially delay of the assembly line, aside from being a nuisance to the operator. In the case of a loose fit, the desired rotational orientation of the steering shaft relative to the outer jacket can be compromised, thereby leading to a less that desired finished assembly. Further yet, having to form the shaft and jacket openings is costly from a machining standpoint.

Accordingly, it is desired to provide a device that enables the steering shaft and outer jacket to be maintained in the neutral position relative to one another during assembly, while addressing at least the problems discussed above.

SUMMARY OF THE INVENTION

According to one exemplary embodiment of the disclosure a steering column assembly is provided. The steering shaft assembly has a tubular jacket assembly bounding a bore extending along a central axis between a jacket lower end and a jacket upper end and a steering shaft assembly extending along the central axis through the bore between a steering shaft lower end and a steering shaft upper end. A breakaway device extends between the tubular jacket assembly and the steering shaft assembly. The breakaway device has a first state, where the steering shaft assembly is prevented from rotating relative to the tubular jacket assembly, and a second state, where the steering shaft assembly is free to rotate relative to the tubular jacket assembly. The breakaway device has at least one frangible tab having non-fractured state, where the breakaway device is in the first state, and a fractured state, where the breakaway device is in the second state.

In another exemplary embodiment of the present invention, a steering shaft anti-rotation breakaway device is provided for a steering column assembly having a tubular jacket assembly with a steering shaft assembly extending therethrough. The steering shaft anti-rotation breakaway device has an outer member configured to be fixed against rotation with the tubular jacket assembly and an inner member configured to be fixed against rotation with the steering shaft assembly. At least one frangible tab couples the outer member to the inner member while in a non-fractured state to maintain the anti-rotation breakaway device as a single, unitary piece of material, where the outer member and the inner member are fixed against movement relative to one another. The at least one frangible tab decouples the outer member from the inner member in a fractured state, where the single, unitary piece of material is transformed into separate pieces of material, where the outer member and the inner member are moveable relative to one another.

In another exemplary embodiment of the present invention, a method of assembling a steering column assembly is provided. The method includes providing a tubular jacket assembly bounding a bore extending along a central axis between a jacket lower end and a jacket upper end and disposing a steering shaft assembly along the central axis through the bore. Further, coupling a breakaway device, while in a first state, to the tubular jacket assembly and to the steering shaft assembly to prevent the steering shaft from being able to rotate relative to the tubular jacket assembly. Then, attaching the steering column assembly to the body of the motor vehicle, and further, applying a torque to the steering shaft assembly to transition the breakaway device to a second state, where the steering shaft assembly is free to rotate relative to the tubular jacket assembly.

These and other advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 7 is a view similar to FIG. 6 illustrating the steering shaft anti-rotation breakaway device fixedly mounted to the mounting surface, with the frangible tabs shown in their non-fractured state;

FIG. 8 is a view similar to FIG. 7 with the frangible tabs shown in their fractured state upon rotating the steering shaft relative to the steering jacket assembly of the steering column assembly;

DETAILED DESCRIPTION

Figure 1:
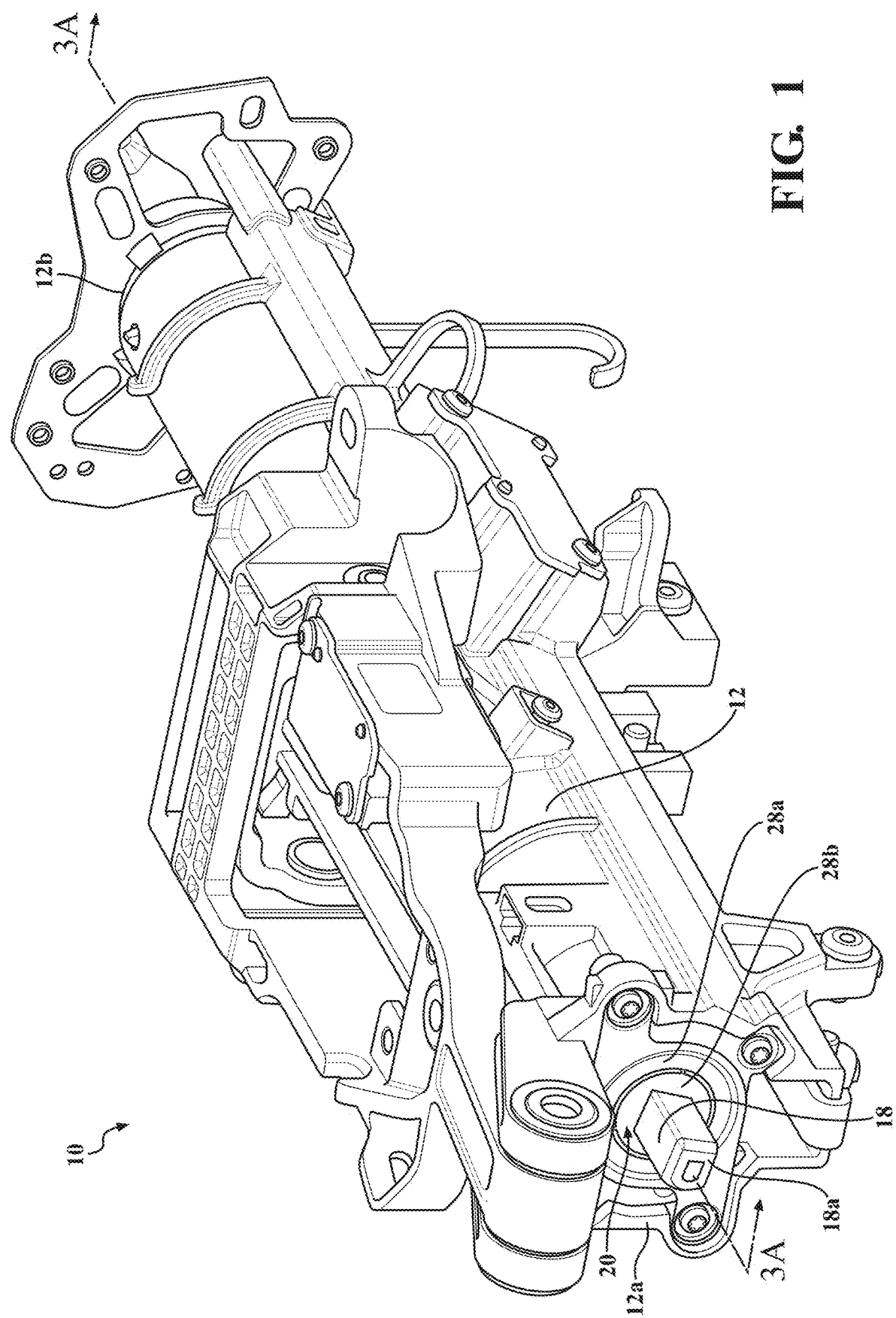
FIG. 1 is a perspective view of a steering column assembly for a motor vehicle having a steering shaft anti-rotation breakaway device according to one embodiment of the disclosure.
Figure 2A:
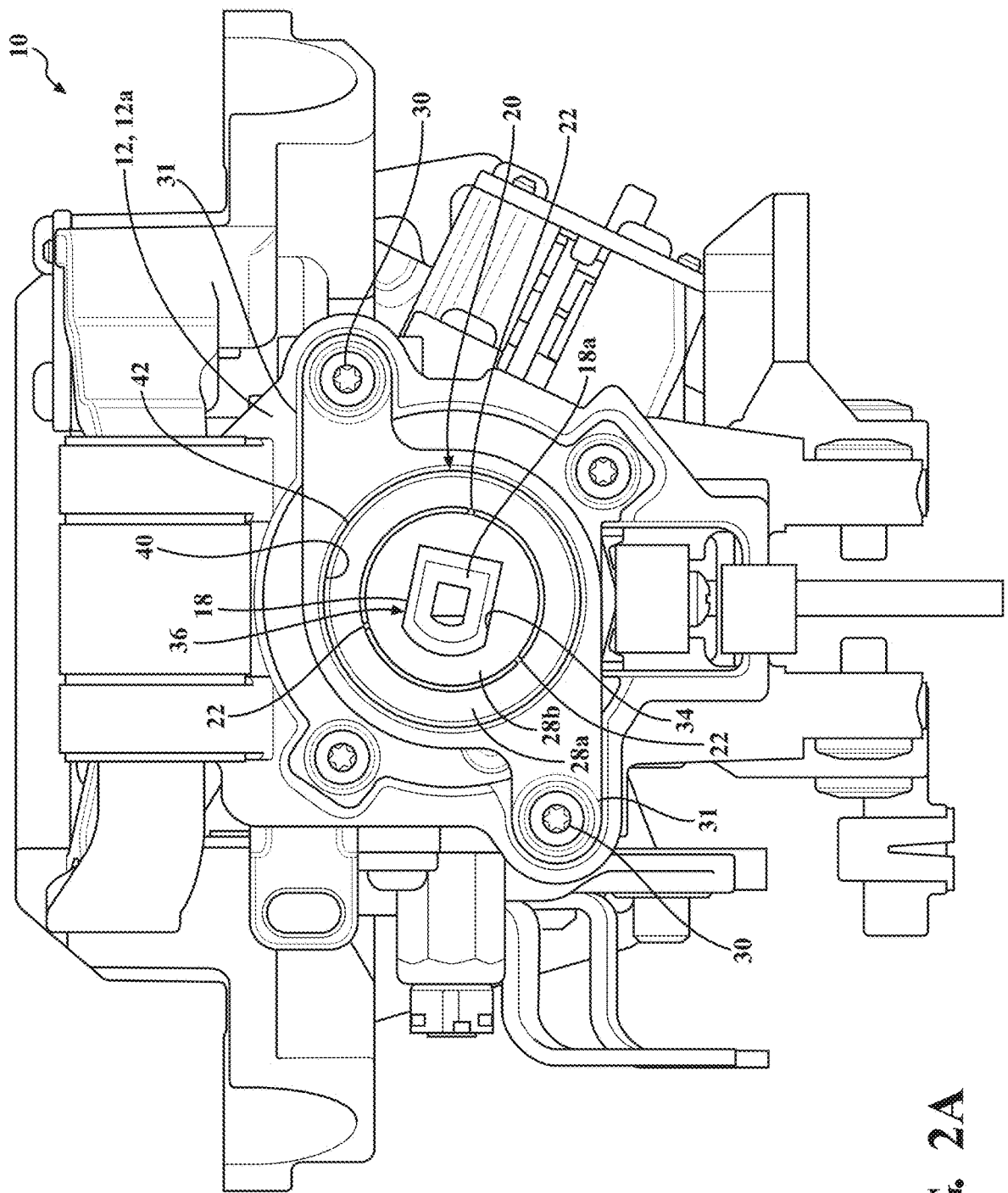
FIG. 2A is an end view of the steering column assembly of FIG. 1 looking generally along the arrow 2A.
Figure 2B:
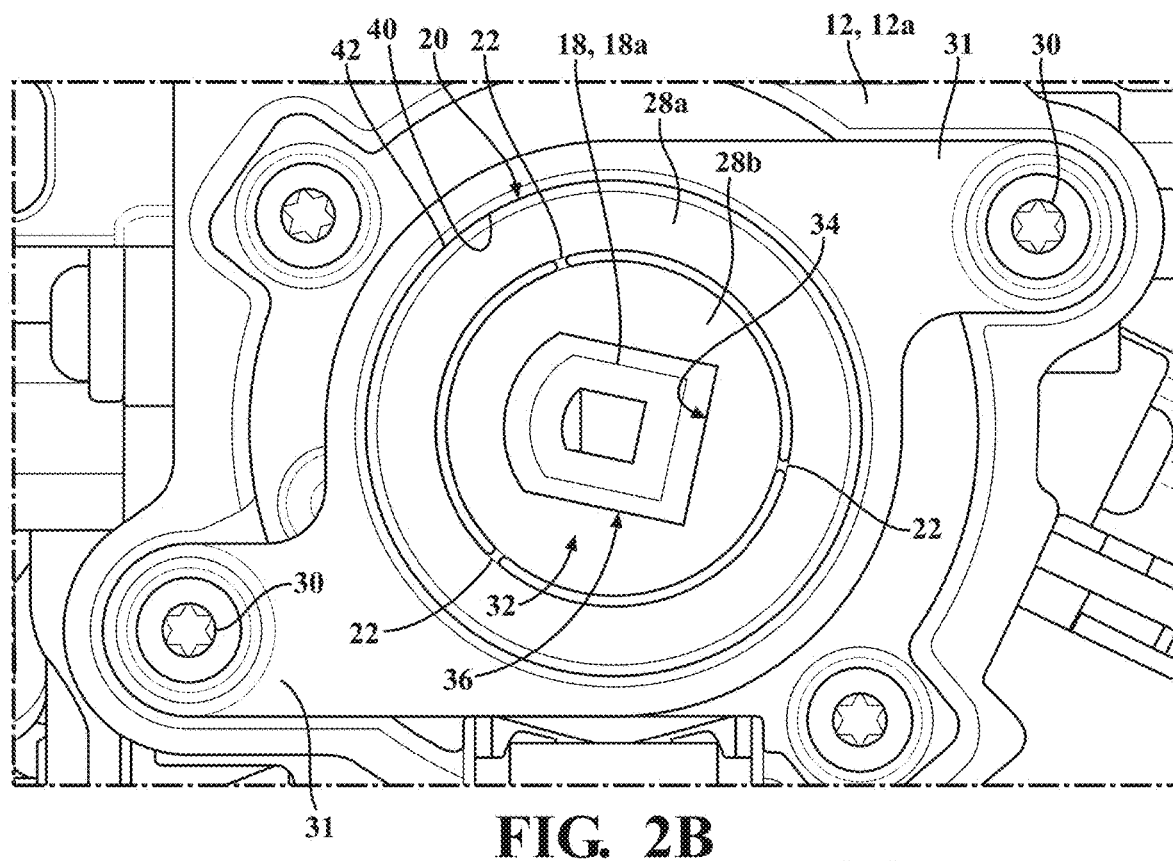
FIG. 2B is an enlarged fragmentary view of the steering column assembly of FIG. 2A better illustrating the steering shaft anti-rotation breakaway device, with frangible tabs of the steering shaft anti-rotation breakaway device shown in a non-fractured state.
Figure 2C:
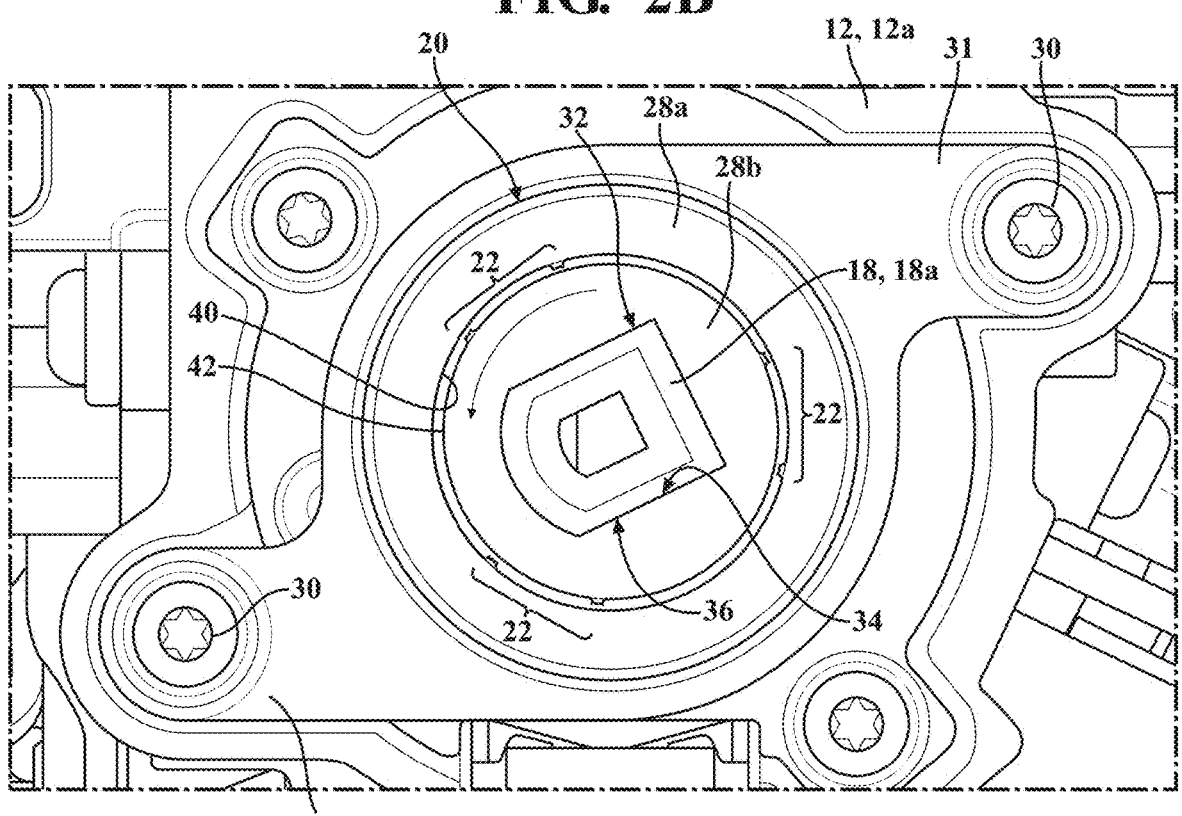
FIG. 2C is a view similar to FIG. 2B illustrating the frangible tabs of the steering shaft anti-rotation breakaway device shown in a fractured state.
Figure 3A:
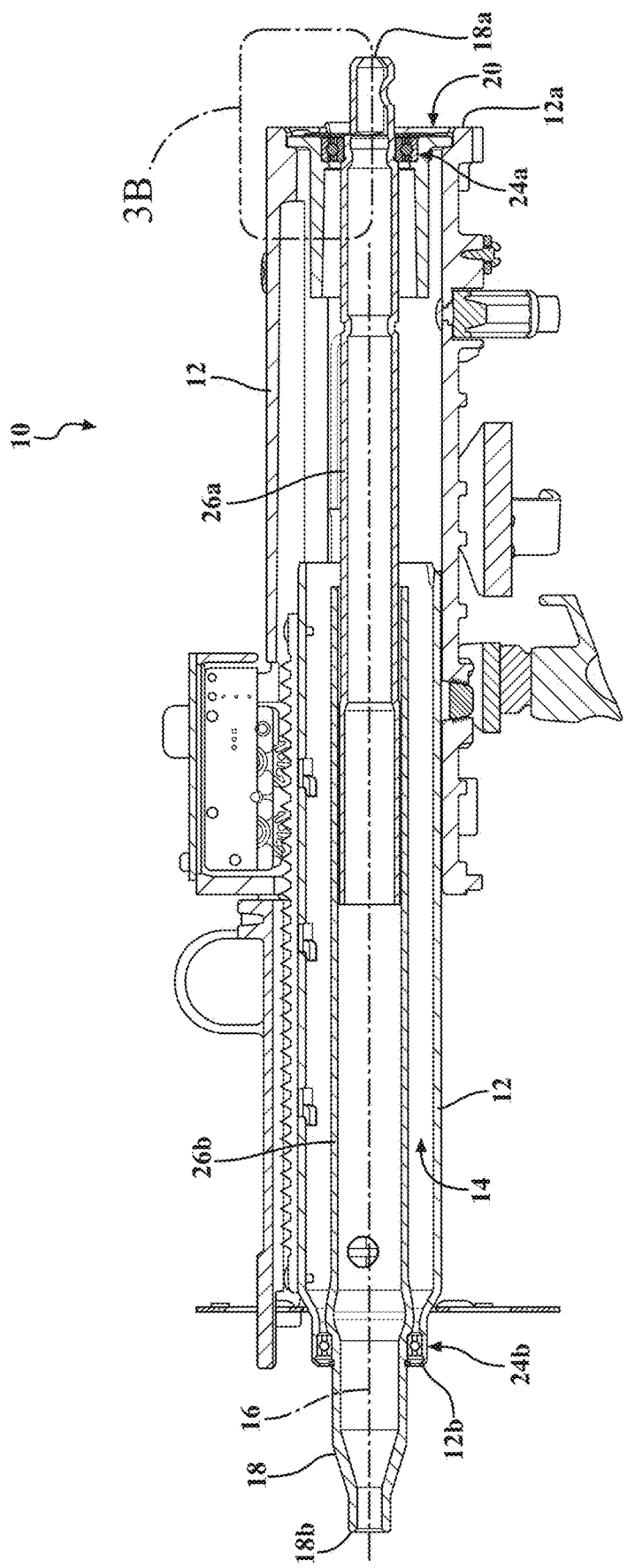
FIG. 3A is a cross-sectional view taken generally along the line 3A-3A of FIG. 1.
Figure 3B:
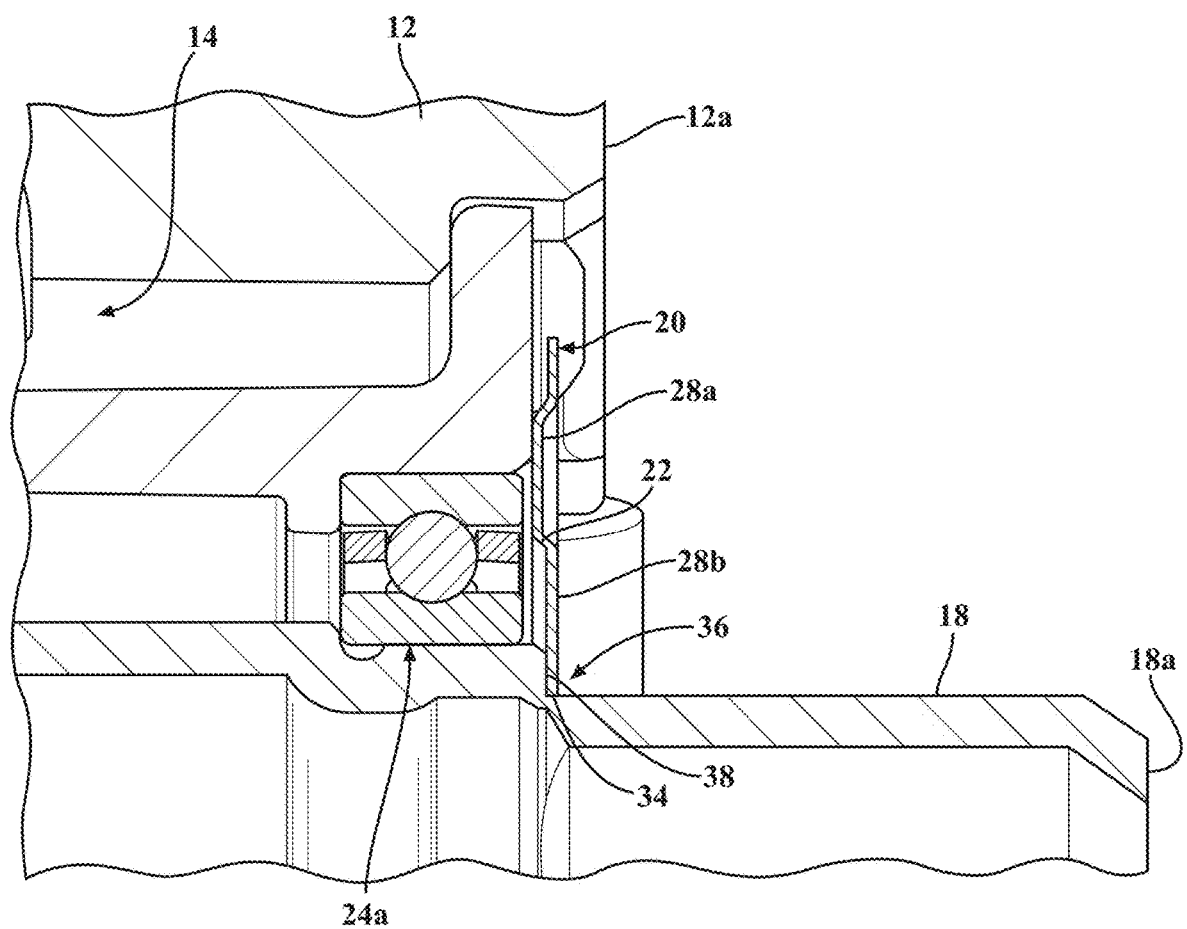
FIG. 3B is an enlarged fragmentary view of the encircled area 3B of FIG. 3A.
Figure 4:
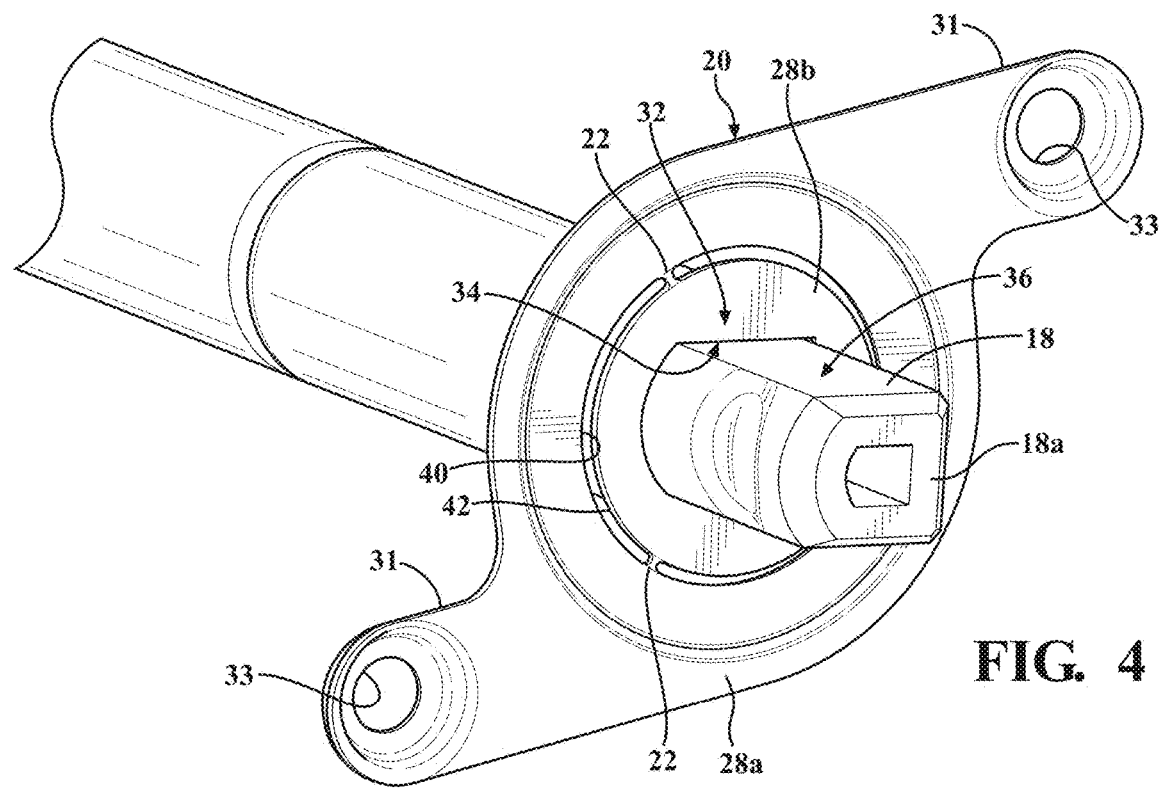
FIG. 4 is a perspective back side view of the steering shaft anti-rotation breakaway device shown with a steering shaft disposed through an opening thereof.
Figure 5:
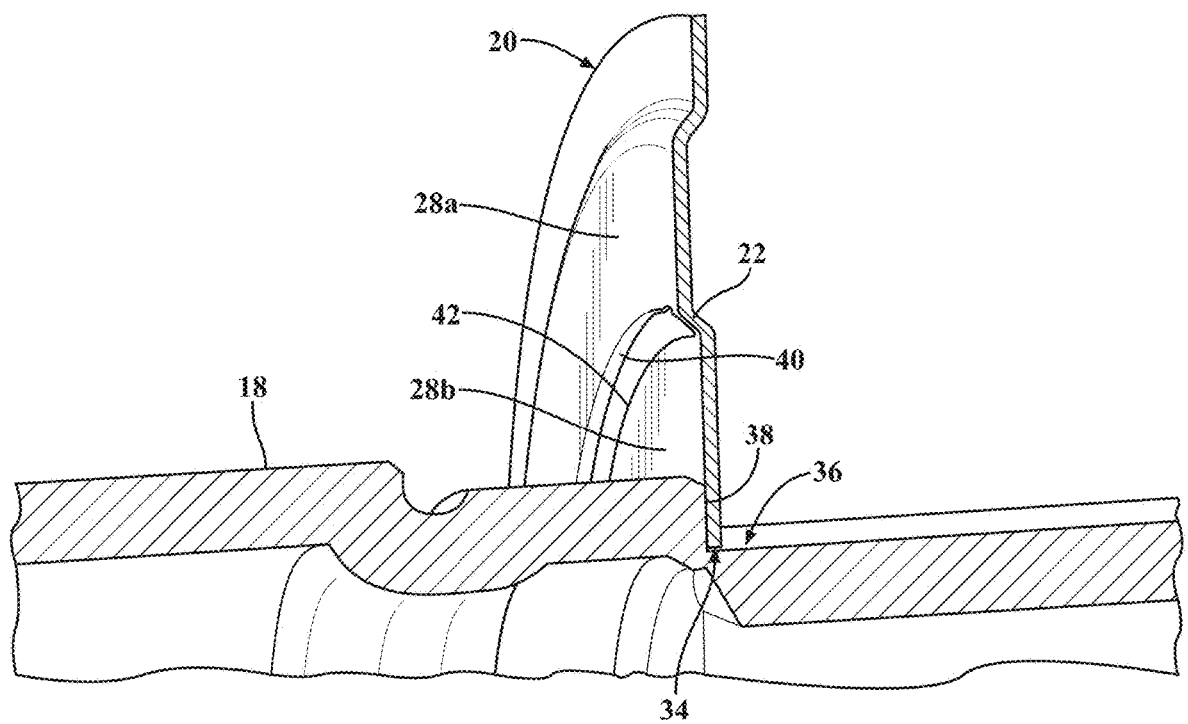
FIG. 5 is a fragmentary front side view of FIG. 4.
Figure 6:
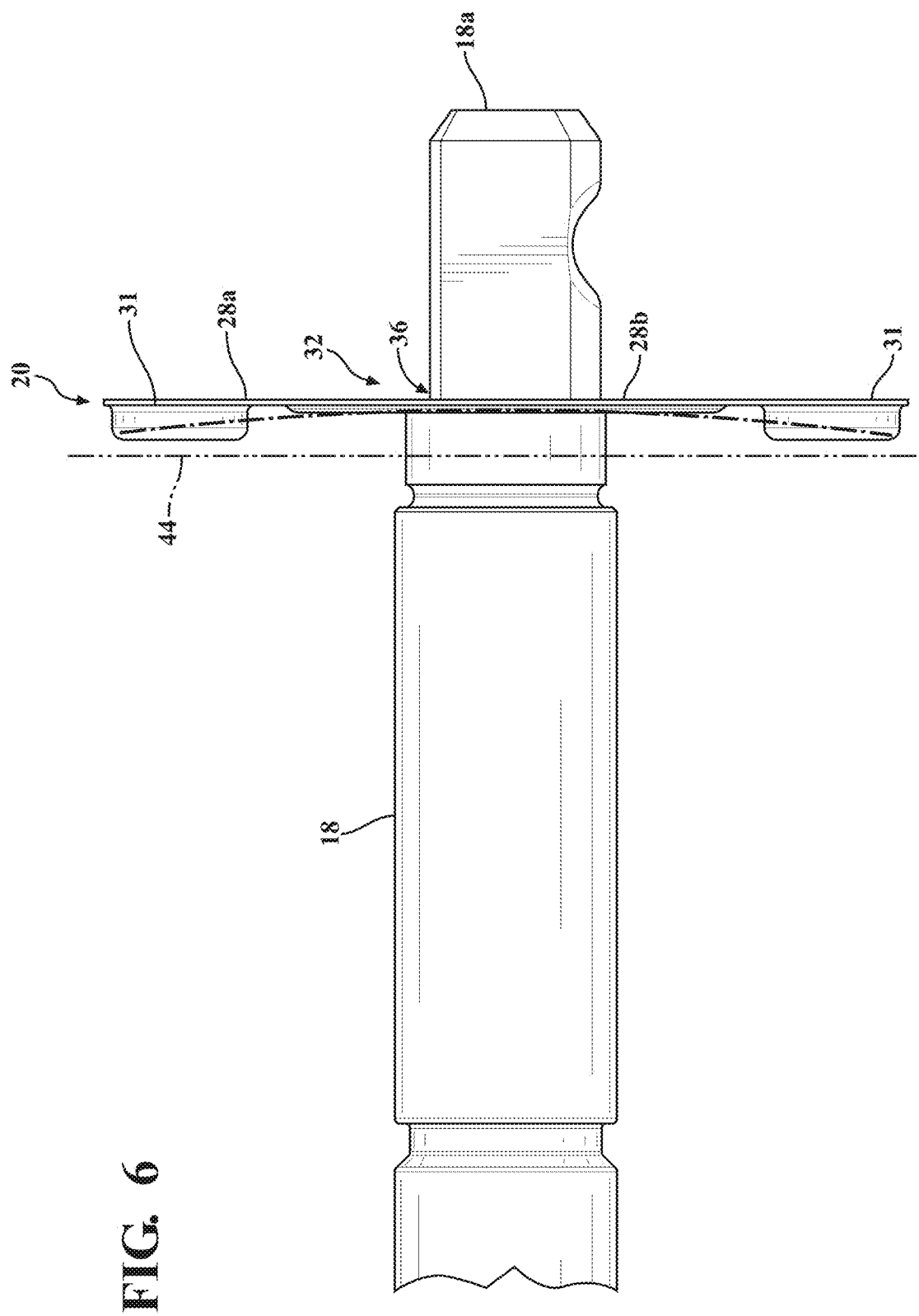
FIG. 6 is a side view of FIG. 4 illustrating a vertical, planar mounting surface of a steering jacket assembly and an arcuate deflection curve of the steering shaft anti-rotation breakaway device upon fixing the steering shaft anti-rotation breakaway device to the mounting surface.

Referring now to the Figures, where the invention will be described with reference to specific embodiments, without limiting same, FIGS. 1, 2A, and 3A illustrate an exemplary steering column assembly 10 for a motor vehicle, such as any modern platform passenger motor vehicle (not shown). The steering column assembly 10 includes a tubular jacket assembly 12 bounding a bore 14 extending along a longitudinal central axis 16 between a jacket lower end 12a and a jacket upper end 12b. The steering column assembly 10 further includes a steering shaft assembly 18 extending along the longitudinal central axis 16, through the bore 14, between a steering shaft lower end 18a and a steering shaft upper end 18b. The steering column assembly 10 further yet includes a steering shaft anti-rotation breakaway device, referred to hereafter as breakaway device 20, extending between the tubular jacket assembly 12 and the steering shaft assembly 18. The breakaway device 20 has a first state, where the steering shaft assembly 18 is prevented from being able to rotate about the longitudinal central axis 16 relative to the tubular jacket assembly 12, such that the steering shaft assembly 18 and the tubular jacket assembly 12 remain fixed against rotational movement relative to one another, and a second state, where the steering shaft assembly 18 is free to rotate about the longitudinal central axis 16 relative to the tubular jacket assembly 12. The breakaway device 20 has at least one frangible member, also referred to as frangible tab 22, wherein the at least one frangible tab 22 has non-fractured state, where the breakaway device 20 is in the single piece, unitary first state, and a fractured state, where the breakaway device 20 is in the separated components, second state. The breakaway device 20, while in the first state, serves to maintain a desired rotational position of the steering shaft assembly 18 relative to the tubular jacket assembly 12 during assembly of the steering column assembly 10 to the motor vehicle, thereby facilitating a rotationally centered position of a hand wheel, also referred to as steering wheel (not shown), and then, after assembly, as discussed further below, the breakaway device 20 can be transitioned to the second state to allow free, unrestricting rotation of the steering shaft assembly 18 relative to the tubular jacket assembly 12 during use and steering of the motor vehicle.

The steering shaft assembly 18 is supported for rotation in the bore 14 about the longitudinal central axis 16 by a plurality of bearings, illustrated as a lower bearing, such as lower roller bearing 24a, by way of example and without limitation, and an upper bearing, such as an upper roller bearing 24b, by way of example and without limitation. The lower bearing 24a is illustrated fixed adjacent the tubular jacket lower end 12a, while the upper bearing 24b is illustrated fixed adjacent the tubular jacket upper end 12b. Steering shaft assembly 18 can be provided as a single, unitary piece of material, or as illustrated, having a plurality of pieces of material (FIG. 3A), shown as a lower steering shaft 26a and an upper steering shaft 26b, fixed to one another. As discussed further below, the breakaway device 20 can be fixed adjacent the tubular jacket lower assembly lower end 12a to function as both a steering shaft anti-rotation breakaway device, thereby preventing rotation of the steering shaft assembly 18 during assembly of the steering column assembly 10 to the motor vehicle, and as a bearing retainer cap to retain the lower bearing 24a within the bore 14 of the tubular jacket assembly 12 in the desired axial position relative to the longitudinal central axis 16, and further acting to shield the lower bearing 24a against ingress of sources of contamination. Accordingly, the breakaway device 20 is multifunctional, whereupon the breakaway device 20 can be transitioned to its second state after completing assembly of the steering column assembly 10 to the motor vehicle, where the steering shaft assembly 18 is free to rotate about the longitudinal central axis 16 while steering the motor vehicle in use, while the tubular jacket assembly 12 remains fixed in attached relation with a vehicle body frame member (not shown) against relative movement therewith.

The breakaway device 20, in accordance with one embodiment of the disclosure, as illustrated in FIGS. 2B, 2C, 3B, and 4-8, has an outer portion, also referred to as outer member 28a, fixed against rotation with the tubular jacket assembly 12 and an inner portion, also referred to as inner member 28b, fixed against rotation with the steering shaft assembly 18. The outer member 28a and the inner member 28b are coupled together against relative rotation by the at least one frangible tab 22 while the at least one frangible tab 22 is in the non-fractured state to maintain the breakaway device 20 in the single piece, unitary first state. The outer member 28a and the inner member 28b are decoupled from one another into separate components, thereby allowing relative rotation between the outer member 28a and the inner member 28b, upon the at least one frangible tab 22 being transitioned to the fractured state, thereby placing the breakaway device 20 in the second state. The outer member 28a has an inner periphery 40 and the inner member 28b has an outer periphery 42, with the at least one frangible tab 22 extending from the inner periphery 40 to the outer periphery 42 while in the non-fractured state, thereby coupling the outer member 28a to the inner member 28b in fixed relation to one another. The at least one frangible tab 22 is shown as a plurality of frangible tabs 22 spaced from one another about the central axis 16, and in the non-limiting embodiment, as three frangible tabs 22 spaced equidistantly from one another about the inner and outer peripheries 40, 42. The frangible tab(s) 22 can be sized and shaped, as desired, to provide the desire strength and torque required to fracture the frangible tabs 22 after completing assembly of the steering column assembly 10 to the motor vehicle. Upon completing assembly, a torque can be applied to the breakaway device 20 by rotating the steering shaft assembly 18 at a torque above the fracture strength of the frangible tab(s) 22, thereby causing the tab(s) 22 to transition from the first, non-fractured state to the second, fractured state. In a non-limiting embodiment, application of a torque within a range of 50 to 200 Nm, and more preferably between 75 and 150 Nm is contemplated in order to transition the tab(s) 22 from the first, non-fractured state to the second, fractured state.

As shown in FIG. 7, the outer member 28a can be fixed directly to the tubular jacket assembly 12 via at least one fastener 30, and shown in the non-limiting embodiment as a pair of fasteners 30. To facilitate fixing the outer member 28a to the tubular jacket assembly 12, the outer member 28a can be formed having at least one, and shown, by way of example and without limitation, as pair of diametrically opposite flanges 31, with a fastener opening 33 in each flange 31 configured for receipt of a corresponding fastener 30 therethrough. The inner member 28b is fixed against rotation with the steering shaft assembly 18 by an anti-rotation feature 32. In the non-limiting embodiment, the anti-rotation feature 32 includes a non-circular through opening 34 in the inner member 28b and a non-circular outer surface 36 on the steering shaft assembly 18. The non-circular outer surface 36 extends through the non-circular through opening 34, with the corresponding non-circular through opening 34 and the non-circular outer surface 36 being shaped and sized to prevent relative rotation therebetween. In the non-limiting embodiment illustrated, the non-circular outer surface 36 and the non-circular through opening 34 mate with one another, such that the non-circular outer surface 36 and the non-circular through opening 34 have the same non-circular geometric shapes, with the non-circular outer surface 36 having a line-to-line or a slight interference or a slightly loose fit with the non-circular through opening 34. If a slightly loose fit is provided, it is to be understood that negligible relative movement is provided between the breakaway device 20 and the steering shaft assembly 18. The non-circular outer surface 36 of the steering shaft assembly 18 is illustrated as extending from the lower end 18a to a shoulder 38, such that upon assembly, the inner member 28b of the breakaway device 20 confronts the shoulder 38 in engagement therewith, such that the shoulder 38 acts as a limiting stop surface as the fasteners 30 fix the outer member 28a to a mounting surface 44 of the tubular jacket assembly 12. The shoulder 38 can be provided as an annular, circumferentially continuous shoulder, if desired. The shoulder 38 and the mounting surface 44 are axially offset relative to one another along the central axis 16, such that during assembly of the breakaway device 20, the breakaway device 20 caused to be biased and flex resiliently, as shown in FIG. 7.

As shown in FIG. 8, upon fixing the breakaway device 20 to the steering column assembly 10, and particularly upon transitioning the breakaway device 20 to the second state, where the frangible tab(s) 22 is fractured (FIG. 8) and where the breakaway device 20 is in the second state, the outer member 28a extends along a first plane P1 and the inner member 28b extends along a second plane P2, wherein the first plane P1 and second plane P2 extend in generally parallel relation with one another in axially spaced relation from one another along the central axis 16. As such, fractured frangible tab(s) 22, and any material of the fracture frangible tab(s) 22 remaining on the outer member 28a and/or inner member 28b, is spaced from one another sufficiently such that interference therebetween is prevented during rotation of the steering shaft assembly 18, thereby preventing interference and the generation of noise. The spacing of the material of the fractured frangible tab(s) 22 after being fractured (FIG. 8) is facilitated by the initial biased, resilient flexing imparted between the outer member 28a and the inner member 28b during initial assembly (FIG. 7) while the breakaway device 20 is in the first state. The initial biased, resilient flexing imparted between the outer member 28a and the inner member 28b causes the material of the frangible tab(s) 22 to spring axially away from one another to an unbiased state upon being fractured, thereby being spaced out of possible contact during use of the steering column assembly 10.

Figure 9A:
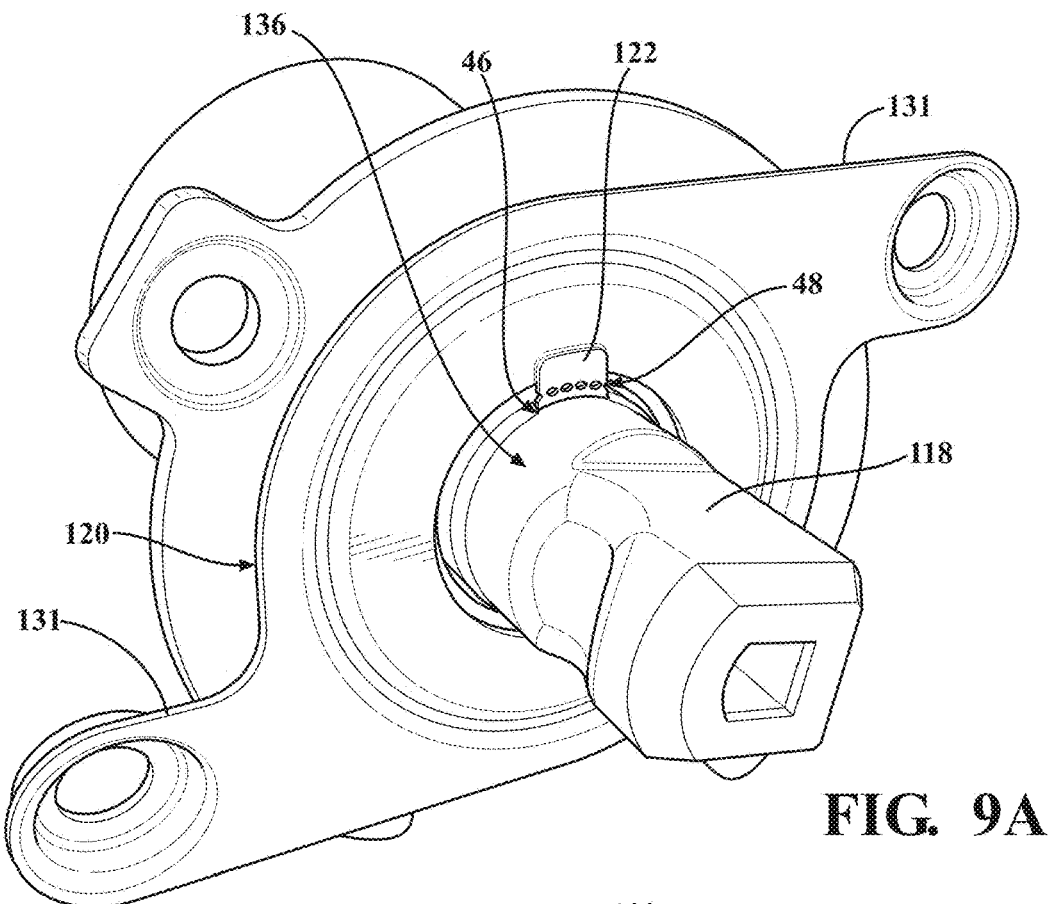
FIG. 9A is a view similar to FIG. 4 illustrating a steering shaft anti-rotation breakaway device according to another embodiment of the disclosure, with a frangible tab of the steering shaft anti-rotation breakaway device shown in a non-fractured state.

In accordance with another aspect of the disclosure, FIG. 9A illustrates a breakaway device 120 constructed in accordance with another embodiment of the disclosure. The breakaway device 120 functions to perform the same function as discussed above for breakaway device 20 during assembly of the steering column assembly to the motor vehicle, namely, to maintain a desired rotational orientation of a steering shaft assembly 118 relative to a tubular jacket assembly (same as illustrated for tubular jacket assembly 12), and then after completing assembly of the steering column assembly, the breakaway device 120 can be readily transitioned from the first state to the second state.

The breakaway device 120 has at least one frangible member, also referred to as frangible tab 122, wherein the at least one frangible tab 122 has non-fractured state (FIG. 9A), where the breakaway device 120 is in the first state, and a fractured state (FIG. 9B), where the breakaway device 120 is in the second state. The breakaway device 120, while in the first state, serves to maintain a desired rotational position of the steering shaft assembly 118 relative to the tubular jacket assembly 12 during assembly of the steering column assembly 10 to the motor vehicle, and then, after assembly, the breakaway device 120 can be transitioned to the second state to allow free, unrestricting rotation of the steering shaft assembly 118 relative to the tubular jacket assembly 12 during use and steering of the motor vehicle.

Figure 9B:
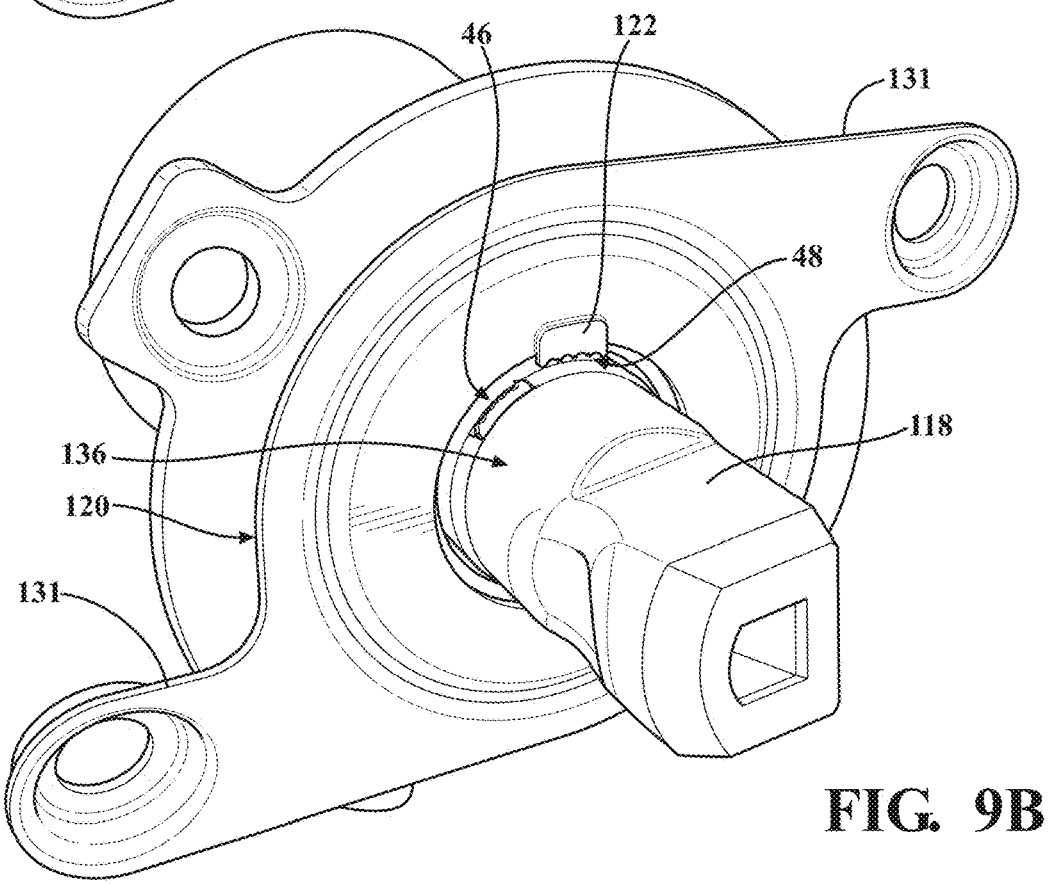
FIG. 9B is a view similar to FIG. 9A illustrating the frangible tab of the steering shaft anti-rotation breakaway device in a fractured state.

The steering shaft assembly 118 has an outer surface 136 with at least one slot, and shown as a single slot 46, by way of example and without limitation, extending into the outer surface 136 and at least one frangible tab, and shown as a single frangible tab 122, by way of example and without limitation, is disposed in the slot 46 while in the non-fractured state, where the breakaway device 120 is in the first state. The frangible tab 122 can be provided having a weakened region 48, such as by being reduced in thickness and/or perforated, for example, to promote transitioning the frangible tab 122 from the non-fractured state to the fractured state, where the breakaway device 120 is in the second state. The breakaway device 120 has flanges 131 as discussed above for flanges 31 to facilitate fixing the breakaway device 120 to the tubular jacket assembly 12. Upon completing assembly of the steering column assembly to the motor vehicle, as illustrated in FIG. 9B, a torque can be applied to the breakaway device 120 by rotating the steering shaft assembly 118 at a torque above the fracture strength of the frangible tab(s) 122, thereby causing the tab(s) 122 to transition from the first, non-fractured state to the second, fractured state. In a non-limiting embodiment, application of a torque within a range of 50 to 200 Nm, and more preferably between 75 and 150 Nm is contemplated in order to transition the tab(s) 122 from the first, non-fractured state to the second, fractured state.

Figure 10A:
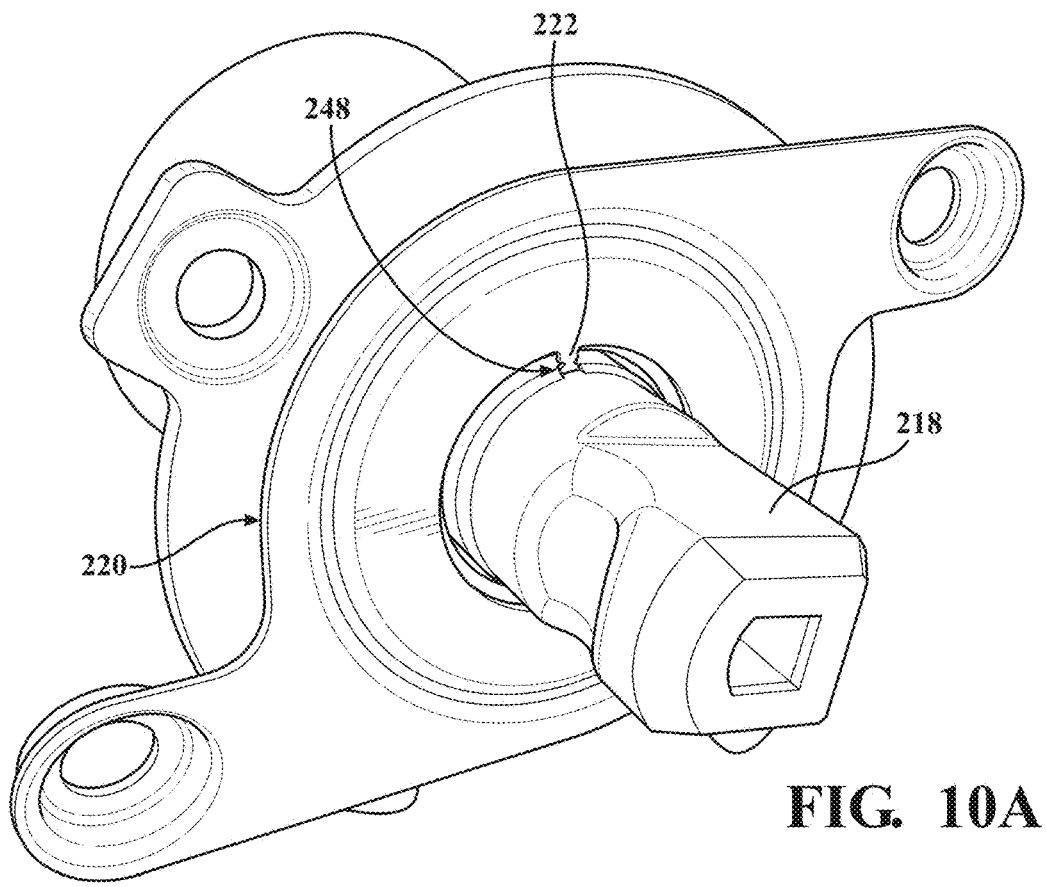
FIG. 10A is a view similar to FIG. 9A illustrating a steering shaft anti-rotation breakaway device according to yet another embodiment of the disclosure, with a frangible tab of the steering shaft anti-rotation breakaway device shown in a non-fractured state.
Figure 10B:
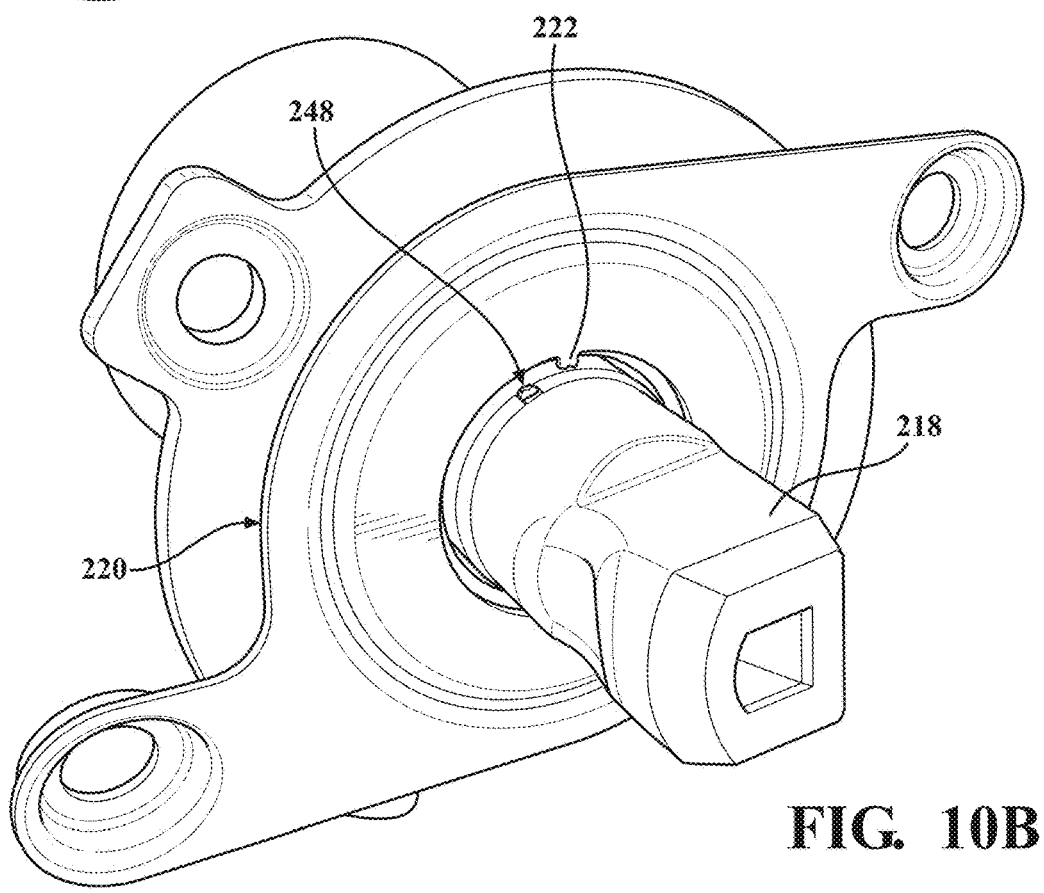
FIG. 10B is a view similar to FIG. 10A illustrating the frangible tab of the steering shaft anti-rotation breakaway device in a fractured state.

In accordance with another aspect of the disclosure, FIG. 10A illustrates a breakaway device 220 constructed in accordance with another embodiment of the disclosure. The breakaway device 220 is constructed similarly to the breakaway device 110, and functions to perform the same function as discussed above for breakaway device 20 during assembly of the steering column assembly to the motor vehicle, namely, to maintain a desired rotational orientation of a steering shaft assembly 218 relative to a tubular jacket assembly (same as illustrated for tubular jacket assembly 12), and then after completing assembly of the steering column assembly, the breakaway device 220 can be readily transitioned from the first state to the second state. The breakaway device is similar to breakaway device 120, however, a frangible tab 222 can be provided having reduced size, including circumferentially extending width, and can include a weakened region 248, such as by having a notch or opposed notches formed in opposite sides of the frangible tab 222, for example, to promote transitioning the frangible tab 222 from the non-fractured state (FIG. 10A) to the fractured state (FIG. 10B), where the breakaway device 220 is in the second state.

Figure 11A:
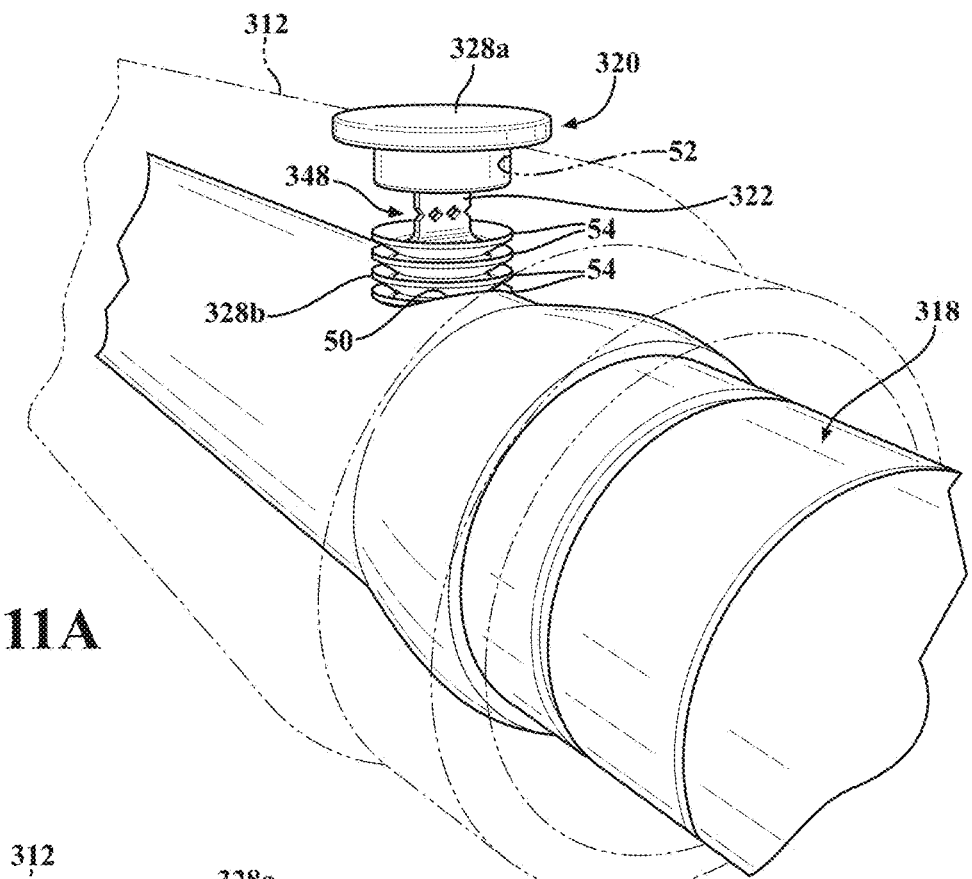
FIG. 11A is a perspective view of a steering jacket assembly with a steering shaft disposed therethrough, with a steering shaft anti-rotation breakaway device according to yet another embodiment of the disclosure, with a frangible tab of the steering shaft anti-rotation breakaway device shown in a non-fractured state.

In accordance with another aspect of the disclosure, FIG. 11A illustrates a breakaway device 320 constructed in accordance with another embodiment of the disclosure. The breakaway device 320 functions to perform the same function as discussed above for breakaway device 20 during assembly of the steering column assembly to the motor vehicle, namely, to maintain a desired rotational orientation of a steering shaft assembly 318 relative to a tubular jacket assembly 312, and then after completing assembly of the steering column assembly, the breakaway device 320 can be readily transitioned from a first state, corresponding to a non-fracture state, to a second state, corresponding to a fractured state.

Figure 11B:
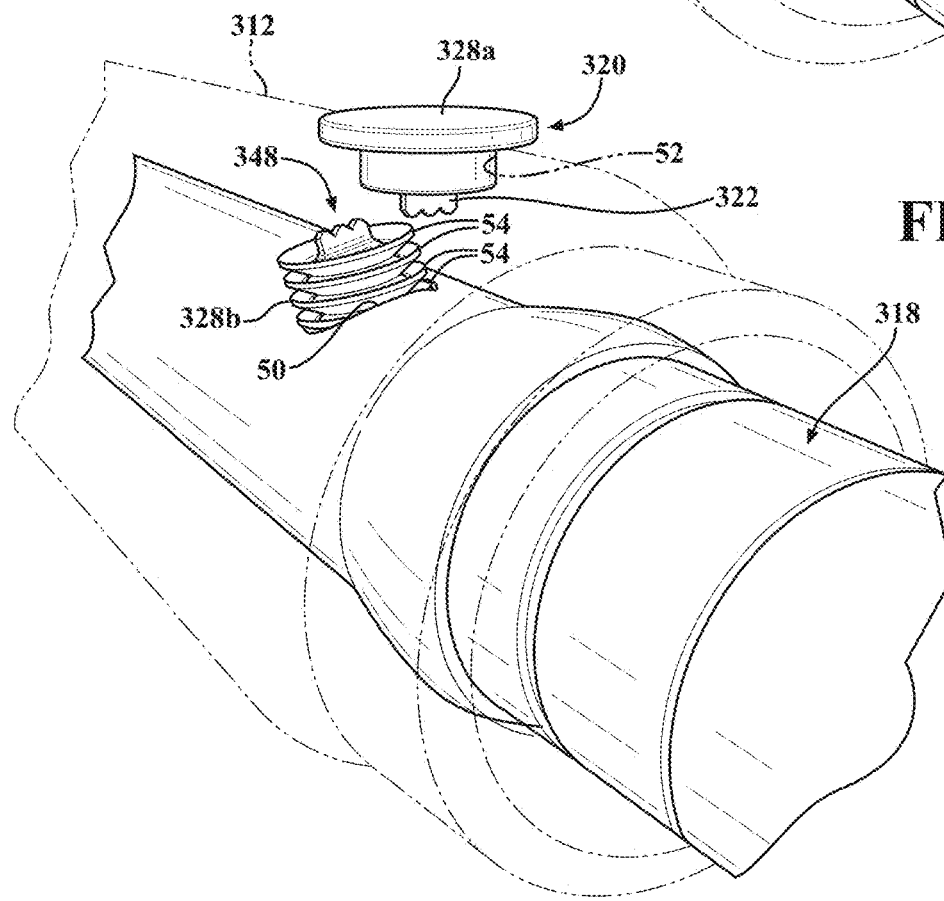
FIG. 11B is a view similar to FIG. 11A illustrating the frangible tab of the steering shaft anti-rotation breakaway device in a fractured state.

The steering shaft assembly 318 has a shaft outer surface 336 with a shaft opening 50 extending therein and the tubular jacket assembly 312 has a tubular wall with a jacket opening 52 extending therethrough. The breakaway device 320 has an outer member 328a disposed within the jacket opening 52 and the inner member 328b disposed within the shaft opening 50, with a frangible tab 322 coupling the outer member 328a to the inner member 328b while in the non-fractured state. With the breakaway device 320 fixed in place, the tubular jacket assembly 312 and the steering shaft assembly 318 are locked against relative rotation with another such that the steering shaft assembly 318 is maintained in the desired rotational orientation, such as a neutral orientation corresponding wheels of the motor vehicle being in a straight forward orientation and the steering wheel being in the neutral, straight steering orientation, where the wheels roll along a straight path, by way of example and without limitation, throughout assembly of the steering column assembly to the motor vehicle, as with the previously discussed embodiments of breakaway devices 18, 118, 218. The inner member 328a can be configured having a cylindrical or conical shape having a plurality of annular ridges 54 sized to snap into the shaft opening 50 upon being pressed therein. Upon completing assembly of the steering column assembly to the motor vehicle, a torque can be applied to the breakaway device 320 by rotating the steering shaft assembly 318 at a torque above the fracture strength of the frangible tab 322, thereby causing the frangible tab 322 to transition from the first, non-fractured state to the second, fractured state, facilitated by a weakened region 348, as illustrated in FIG. 11B. In a non-limiting embodiment, application of a torque within a range of 50 to 200 Nm, and more preferably between 75 and 150 Nm is contemplated in order to transition the tab 322 from the first, non-fractured state to the second, fractured state. It is to be understood the breakaway device 320 can be located anywhere desired along the axially extending length of the tubular jacket assembly 312 and the steering shaft assembly 318, as desired.

In accordance with another aspect of the disclosure, a method of assembling a steering column assembly 10 to a body of a motor vehicle is provided. The method includes providing a tubular jacket assembly 12, 112, 212, 312 bounding a bore 14 extending along a central axis 16 between a jacket lower end 12a and a jacket upper end 12b. Further, disposing a steering shaft assembly 18, 118, 218, 318 along the central axis 16 through the bore 14, and coupling a breakaway device 20, 120, 220, 320, while in a first state, to the tubular jacket assembly 12, 112, 212, 312 and the steering shaft assembly 18, 118, 218, 318 to prevent the steering shaft from being able to rotate relative to the tubular jacket assembly. Then, attaching the steering column assembly 10 to the body of the motor vehicle, and then, applying a torque to the steering shaft assembly 18, 118, 218, 318 to transition the breakaway device 20, 120, 220, 320 to a second state, where the steering shaft assembly 18, 118, 218, 318 is free to rotate relative to the tubular jacket assembly 12, 112, 212, 312.

The method can further include providing the breakaway device 20, 120, 220, 320 having at least one frangible tab 22, 122, 222, 322 having non-fractured state, where the breakaway device 20, 120, 220, 320 is in the first state, and a fractured state, where the breakaway device 20, 120, 220, 320 is in the second state, and causing the at least one frangible tab 22, 122, 222, 322 to transition from the non-fractured state to the fractured state while applying the torque to the steering shaft assembly 18, 118, 218, 318.

The method can further include providing the breakaway device 20, 120, 220, 320 having an outer member 28a, 128a, 228a, 328a and an inner member 28b, 128b, 228b, 328b, and fixing the outer member 28a, 128a, 228a, 328a against rotation with the tubular jacket assembly 12, 112, 212, 312 and fixing the inner member 28b, 128b, 228b, 328b against rotation with the steering shaft assembly 18, 118, 218, 318, wherein the at least one frangible tab 22, 122, 222, 322 couples the outer member 28*a*, 128*a*, 228*a*, 328*a* to the inner member 28*b*, 128*b*, 228*b*, 328*b* while in the non-fractured state to maintain the breakaway device 20, 120, 220, 320 in the first state, and wherein the at least one frangible tab 22, 122, 222, 322 decouples the outer member 28*a*, 128*a*, 228*a*, 328*a* from the inner member 28*b*, 128*b*, 228*b*, 328*b* while in the fractured state to place the breakaway device 20, 120, 220, 320 in the second state.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. A steering column assembly, comprising:
    a tubular jacket assembly bounding a bore extending along a central axis between a jacket lower end and a jacket upper end;
    a steering shaft assembly extending along the central axis through the bore between a steering shaft lower end and a steering shaft upper end; and
    a breakaway device extending between the tubular jacket assembly and the steering shaft assembly, the breakaway device having a first state, where the steering shaft assembly is prevented from being able to rotate relative to the tubular jacket assembly, and a second state, where the steering shaft assembly is free to rotate relative to the tubular jacket assembly, the breakaway device having at least one frangible tab, the at least one frangible tab having non-fractured state, where the breakaway device is in the first state, and a fractured state, where the breakaway device is in the second state.

2. The steering column assembly of claim 1, wherein the breakaway device has an outer member fixed against rotation with the tubular jacket assembly and an inner member fixed against rotation with the steering shaft assembly, the at least one frangible tab coupling the outer member to the inner member while in the non-fractured state to maintain the breakaway device in the first state, the at least one frangible tab decoupling the outer member from the inner member while in the fractured state to place the breakaway device in the second state.

3. The steering column assembly of claim 2, wherein the outer member is fixed to the tubular jacket assembly via at least one fastener and the inner member is fixed against rotation with the steering shaft assembly by an anti-rotation feature.

4. The steering column assembly of claim 3, wherein the anti-rotation feature includes a non-circular through opening in the inner member and a non-circular outer surface on the steering shaft assembly, the non-circular outer surface extending through the non-circular through opening.

5. The steering column assembly of claim 4, wherein the non-circular outer surface and the non-circular through opening mate with one another.

6. The steering column assembly of claim 2, wherein the outer member extends along a first plane and the inner member extends along a second plane, the first and second planes extend in generally parallel relation with one another in axially spaced relation from one another along the central axis while the breakaway device is in the second state.

7. The steering column assembly of claim 2, wherein the at least one frangible tab includes a plurality of frangible tabs spaced from one another about the central axis.

8. The steering column assembly of claim 2, wherein outer member has an inner periphery and the inner member has an outer periphery, the at least one frangible tab extending from the inner periphery to the outer periphery while in the non-fractured state.

9. The steering column assembly of claim 2, wherein the steering shaft assembly has a shaft outer surface with a shaft opening extending therein and the tubular jacket assembly has a wall with a jacket opening extending therethrough, the outer member disposed within the jacket opening and the inner member disposed within the shaft opening, with the at least one frangible tab coupling the outer member to the inner member while in the non-fractured state.

10. The steering column assembly of claim 9, wherein the inner member snaps into the shaft opening.

11. The steering column assembly of claim 1, wherein the steering shaft assembly has an outer surface with a slot extending into the outer surface and the at least one frangible tab is disposed in the slot while in the non-fractured state.

12. The steering column assembly of claim 11, wherein the at least one frangible tab has a weakened region to promote transitioning the at least one frangible tab from the non-fractured state to the fractured state.

13. A steering shaft anti-rotation breakaway device for a steering column assembly having a tubular jacket assembly with a steering shaft assembly extending therethrough, the steering shaft anti-rotation breakaway device comprising:
    an outer member configured to be fixed against rotation with the tubular jacket assembly and an inner member configured to be fixed against rotation with the steering shaft assembly, at least one frangible tab coupling the outer member to the inner member while in a non-fractured state to maintain the anti-rotation breakaway device as a single, unitary piece of material, where the outer member and the inner member are fixed against movement relative to one another, the at least one frangible tab decoupling the outer member from the inner member in a fractured state, where the single, unitary piece of material is transformed into separate pieces of material, where the outer member and the inner member are moveable relative to one another.

14. The steering shaft anti-rotation breakaway device of claim 13, wherein the outer member has an inner periphery and the inner member has an outer periphery, the at least one frangible tab extending from the inner periphery to the outer periphery while in the non-fractured state.

15. The steering shaft anti-rotation breakaway device of claim 14, wherein the outer member extends along a first plane and the inner member extends along a second plane, the first and second planes extend in generally parallel, spaced relation with one another.

16. The steering shaft anti-rotation breakaway device of claim 14, wherein the inner member has a non-circular through opening configured for receipt of a non-circular outer surface of the steering shaft assembly therethrough.

17. The steering shaft anti-rotation breakaway device of claim 16, wherein the outer member has at least one flange with a fastener opening configured for receipt of a fastener therethrough to facilitate fixation of the outer member to the tubular jacket assembly.

18. A method of assembling a steering column assembly to a body of a motor vehicle, comprising:
providing a tubular jacket assembly bounding a bore extending along a central axis between a jacket lower end and a jacket upper end;
disposing a steering shaft assembly along the central axis through the bore; and
coupling a breakaway device, while in a first state, to the tubular jacket assembly and the steering shaft assembly to prevent the steering shaft from being able to rotate relative to the tubular jacket assembly;
attaching the steering column assembly to the body of the motor vehicle; and
applying a torque to the steering shaft assembly to transition the breakaway device to a second state, where the steering shaft assembly is free to rotate relative to the tubular jacket assembly.

19. The method of claim 18, further including providing the breakaway device having at least one frangible tab, the at least one frangible tab having non-fractured state, where the breakaway device is in the first state, and a fractured state, where the breakaway device is in the second state, and causing the at least one frangible tab to transition from the non-fractured state to the fractured state while applying the torque to the steering shaft assembly.

20. The method of claim 19, further including providing the breakaway device having an outer member and an inner member, and fixing the outer member against rotation with the tubular jacket assembly and fixing the inner member against rotation with the steering shaft assembly, wherein the at least one frangible tab couples the outer member to the inner member while in the non-fractured state to maintain the breakaway device in the first state, and wherein the at least one frangible tab decouples the outer member from the inner member while in the fractured state to place the breakaway device in the second state.

\* \* \* \* \*